United States Patent

Brown et al.

[15] 3,689,497
[45] Sept. 5, 1972

[54] SUBSTITUTED BENZOPYRANO (3,4-B) PYRIDINES AND PROCESS FOR THEIR PREPARATION

[72] Inventors: Richard E. Brown, Hanover; John Shavel, Jr., Mendham, both of N.J.

[73] Assignee: Warner-Lambert Company, Morris Plains, N.J.

[22] Filed: March 9, 1971

[21] Appl. No.: 122,508

[52] U.S. Cl. ...260/295 T, 260/247.2 A, 260/294.8 B, 260/295 A
[51] Int. Cl. .............................................C07d 31/34
[58] Field of Search ..................................260/295 T

[56] References Cited

UNITED STATES PATENTS 3,514,464   5/1970   Pars et al................260/295 T

*Primary Examiner*—Alan L. Rotman
*Attorney*—Albert H. Graddis, Frank S. Chow, Neil D. Edwards, Edward G. Comrie and Anne M. Kelly

[57] ABSTRACT

Substituted benzopyrano pyridines having the following structural formula are disclosed:

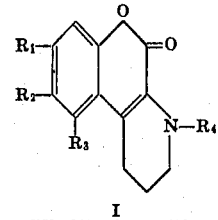

In the above formula, $R_1$ and $R_2$ are hydrogen, hydroxy, lower alkoxy or lower alkyl or $R_1$, $R_2$ taken together with the carbon atoms to which they are attached form a methylenedioxy group.

In addition, $R_1$ can also be an oxyacetic acid or a derivative thereof, such as an ester, amide or a substituted amide. $R_3$ is hydrogen or hydroxy, $R_4$ is hydrogen or an omega-amino alkyl in which the omega-amino group can be further substituted with one or two alkyl groups or may be a part of a heterocyclic system such as morpholine or imidazoline. In addition, $R_4$ may be an acetic acid or a derivative thereof such as an ester, amide or substituted amide. These compounds are prepared by known reactions. They are useful as bronchodilators.

5 Claims, No Drawings

SUBSTITUTED BENZOPYRANO (3,4-B) PYRIDINES AND PROCESS FOR THEIR PREPARATION

The present invention relates to a new class of benzopyrano[3,4-b]pyridines having the following structural formula:

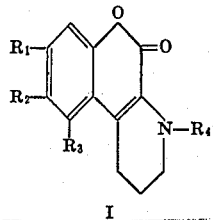

I wherein $R_1$ and $R_2$ are hydrogen, hydroxy, lower alkyl or lower alkoxy, or $R_1$ and $R_2$ taken together with the carbon atoms to which they are attached form a methylenedioxy; $R_3$ is hydrogen or hydroxy. $R_4$ is hydrogen, lower alkyl or substituted alkyl or an omega-alkyl group in which the omega-amino group may be substituted with one or two lower alkyl groups or $R_4$ may be an acetic acid residue or a derivative of said acetic acid such as an ester, amide or substituted amide.

In the above definitions for $R_1$, $R_2$, $R_3$, the term "lower alkyl" and the "lower alkyl" portion of lower alkoxy is meant to include 1 to 7 carbon atoms such as methyl, ethyl, propyl, isopropyl, butyl, isobutyl and the like.

The term "heterocyclic" includes such groups as morpholine or imidazolino.

The compounds of this invention exhibit bronchodilator effect in several species of the mammal. For example, at doses of 20 to 25 mg/kg orally or by injection, the compounds of this invention are capable of relieving bronchioles in guinea pigs whose bronchioles have been constricted by histamine acetyl choline and serotonin.

The compounds of this invention are useful as agents to provide symptomatic relief of asthma. Generally speaking, a dose of about 20 to 100 mg several times daily is recommended for mammals weighing about 70 kilograms. The compounds can be administered orally by parenteral administration or by aerosol therapy.

In order to use these compounds that are formulated with pharmaceutically acceptable excipients such as lactose, water, starch, powdered sugar to give dosage forms such as tablets, capsules, aerosols and the like.

The dosage regimen can of course be varied depending on the weight, age, etc. of the mammal by methods well known to the healing arts.

According to the present invention, the compounds of this invention are prepared in accordance with the following reaction scheme:

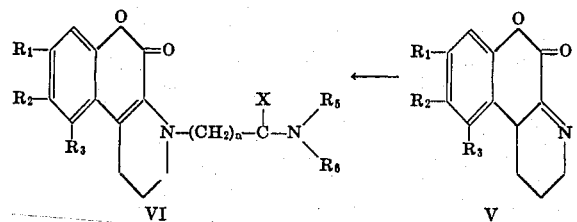

In the first step, a phenol of structure II is reacted with the known carbethoxy piperidone III in the presence of an acid catalyst to give the coumarin IV. Exemplary of the phenols which may be used, all of which are commercially available or were prepared by methods described in the literature, are m-methoxyphenol, sesamol and m-cresol. Among the acid catalysts which may be used are sulfuric acid, phosphoric acid, phosphorous oxychloride, phosphorous pentoxide and boron fluoride. Hydrolysis of coumarin IV is best accomplished with dilute mineral acid, such as hydrochloric, to give V, in which the coumarin double band is shifted into ring C to give the imino form. Conversion of intermediates of structure V to the final products of structure VI may be accomplished by treatment with the appropriately substituted halogen compound wherein $n$ may be one to six carbon atoms, X may be $H_2$ or keto, and $R_5$ and $R_6$ may be hydrogen, lower alkyl of one to six carbon atoms or taken together may be part of a ring. In the case wherein $R_1$ is an oxyacetic acid derivative, intermediate IV, wherein $R_1$ is OH, is alkylated by standard methods before hydrolysis to V is accomplished.

Although in the following examples only a representative number of compounds are illustrated, it is obvious to those skilled in the art that employing appropriate starting material, other compounds which follow within the scope of this invention can be prepared following the procedures described herein.

The following examples are included to further illustrate the practice of this invention. All degrees are given in the centigrade scale.

EXAMPLE 1

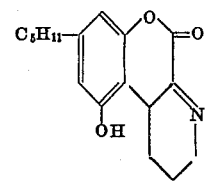

1,2,3,10b-Tetrahydro-10-hydroxy-8-pentyl-5H-[1]benzopyrano[d'3,4-b]-pyridin-5-one A solution of 6.2 g of 1,2,3,4-Tetrahydro-4-acetyl-10 -hydroxy-8-pentyl-5H-[1]benzopyrano[3,4-b]pyridin-

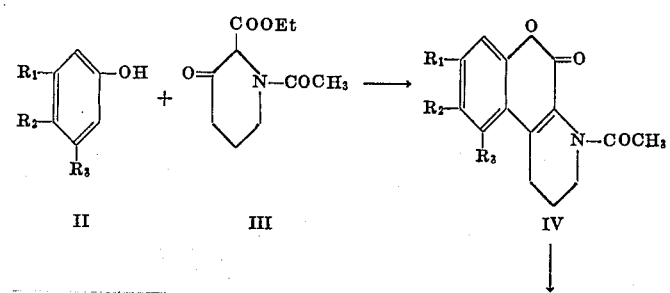

II      III      IV 5-one in 100 ml of ethanol and 200 ml of concentrated hydrochloric acid was refluxed for 18 hours. The solution was concentrated to small volume. The white solid was filtered, and the filter cake slurried in 500 ml of 5 percent sodium bicarbonate solution and the mixture stirred for 2 hours. The yellow solid was filtered and recrystallized twice from ethanol to give 4.8 g of yellow crystals, mp. 181°–4°.

Anal. Calcd for $C_{17}H_{21}NO_3$: C, 71.05; H, 7.37; N, 4.87. Found: C, 70.88; H, 7.36; N, 4.90.

EXAMPLE 2

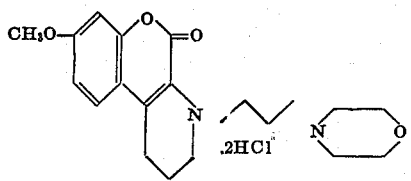

1,2,3,4-Tetrahydro-8-methoxy-4-(2-morpholinoethyl)-5H-[1]benzopyrano[3,4-b]pyridin-5-one dihydrochloride A solution of 5.3 g (0.02 m) of 1,2,3,4-tetrahydro-8-methoxy-5H[1] benzopyrano[3,4-b]pyridin-5-one HCl, 4.1 g (0.022 m) of N-(2-chloroethyl)morpholine HCl and 7.07 g (0.07 m) triethylamine in 100 ml of ABS. EtOH was refluxed for 18 hours. The reaction was filtered and the hot filtrate was treated with excess HCl gas. Cooling to room temperature afforded 7.2 g (86 percent) of DiHCl salt. Crystallization from water yielded analytical material mp. 254°–8° C.

Anal. Calcd for $C_{19}H_{24}N_2O_4 \cdot 2HCl$: C, 54.69; H, 6.28; N, 6.71; Cl, 16.99. Found: C, 54.61; H, 6.33; N, 6.90; Cl, 16.73.

EXAMPLE 3

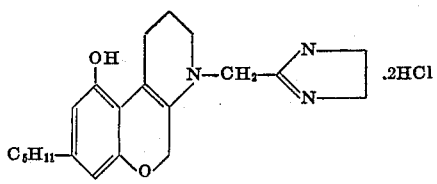

1,2,3,4-Tetrahydro-10-hydroxy-4-(2-imidazolin-2ylmethyl)-8-pentyl-5H-[1]benzopyrano[-b]-pyridin-5-one dihydrochloride A solution of 2.5 g of 1,2,3,10b-tetrahydro-10-hydroxy-8-pentyl-5H-[1]-benzopyrano-[3,4-b]pyridin-5-one in 200 ml of refluxing ethanol was treated with 1.6 g of 2-chloromethyl imidazoline, and the solution refluxed for 18 hours. After cooling, HCl was passed into the reaction mixture. The precipitated solid was filtered, washed with ethanol and dried, mp. 246°–7°.

Anal. Calcd for $C_{21}H_{28}N_3O_3Cl \cdot HCl$: C, 57.02; H, 6.61; N, 9.50; Cl, 16.03. Found: C, 56.44, 56.46; H, 6.77; N, 9.62; Cl, 15.80; 15.78.

EXAMPLE 4

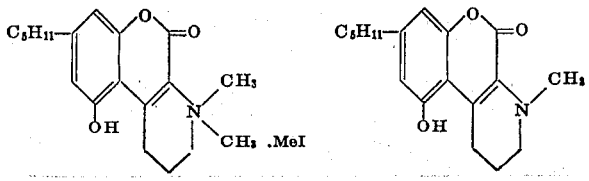

1,3,4,5-Tetrahydro-10-hydroxy-4,4-dimethyl-5-oxo-8-pentyl-2H-[1]-benzopyrano[3,4-b]pyridinium iodide and 1,2,3,4-Tetrahydro-10-hydroxy-4-methyl-8-pentyl-5H-[1]benzopyrano[3,4-b]pyridin-5-one A solution of 17.8 g of 1,2,3-10b-tetrahydro-10-hydroxy-8-pentyl-5H-[1]benzopyrano-[3,4-b]pyridin-5-one in 2.0 l of ethanol was treated with 8.9 g of methyl iodide and the solution left 4 days at room temperature. The crystals were filtered to give 4.6 g of 1,3,4,5-tetrahydro-10-hydroxy-4,4-dimethyl-5-oxo-8-pentyl-2H-[1]benzopyrano[3,4-b]pyridinium iodide, mp. 236°–8°.

Anal. Calcd for $C_{18}H_{23}NO \cdot CH_3I$: C, 51.48; H, 5.91; I, 28.63. Found: C, 51.05; H, 5.98; I, 28.53.

The filtrate from above was concentrated to 75 ml and cooled to give a second crop of the methiodide. The filtrate from the second crop was then diluted with 500 ml of 5 percent sodium bicarbonate solution, the slurry stirred for 1 hour, and the solid filtered, washed with water and dried. The solid (14 g) was stirred for 1 hour in 200 ml of boiling ethyl acetate, then cooled to give 7.0 g of recovered starting material. The filtrate was concentrated to dryness and the residue chromatographed on 300 g of neutral alumina. Elution with 8 percent ethanol-ether gave 5.9 g of solid. This was recrystallized from acetonitrile to give 405 g of 1,2,3,4-tetrahydro-10-hydroxy-4-methyl-8-pentyl-5H-[1]benzopyrano3,4-b]pyridin-5-one, mp. 161°–3°.

Anal. Calcd for $C_{18}H_{23}NO_3$: C, 71.73; H, 7.69; N, 4.65. Found: C, 71.72; H, 7.88; N, 4.94.

EXAMPLE 5

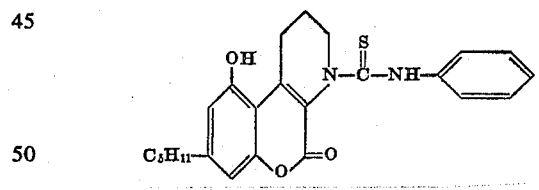

1,3,4,5-Tetrahydro-10-hydroxy-5-oxo-8-pentyl-N-phenylthio-2H-[1]-benzopyrano[3,4-b]pyridine-4-carboxamide A mixture of 3.5 g of 1,2,3,10b-tetrahydro-10-hydroxy-8-pentyl-5H-[1]-benzopyrano[3,4-b]pyridin-5-one and 10 ml of phenylisothiocyanate was stirred at room temperature for one-half hour. The yellow color faded and a new white precipitate formed. The mixture was diluted with 100 ml of ether and the solid filtered and recrystallized from methanol to give 2.8 g of product, mp. 197°–202°.

Anal. Calcd for $C_{24}H_{26}N_2O_3S$: C, 68.22; H, 6.20; N, 6.63; S, 7.59. Found: C, 68.41; H, 6.33; N, 6.41; S, 7.65, 7.63.

EXAMPLE 6

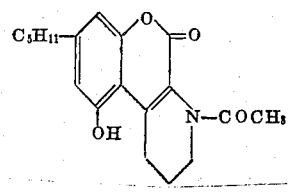

1,2,3,4-Tetrahydro-4-acetyl-10-hydroxy-8-pentyl-5H-[1]benzopyrano-[3,4-b]pyridin-5-one A homogeneous mixture of 49.5 g of 1-acetyl-2-carbethoxy-3-piperidone, 41.8 g of olivetol and 100 ml of concentrated sulfuric acid was prepared in the cold and then left for 64 hours at room temperature. The mixture was decomposed with ice-water and the gummy precipitate slurried in acetonitrile. The crude product was recrystallized from ethanol to give 47.5 g of product, mp. 226°–7°. A sample was recrystallized again from ethanol for analysis, mp. 228°–9°.

Anal. Calcd for $C_{19}H_{23}NO_4$: C, 69.28; H, 7.04; N, 4.25. Found: C, 69.41; H, 7.04; N, 4.51.

EXAMPLE 7

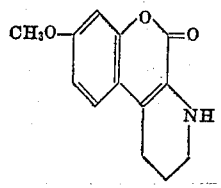

1,2,3,5-Tetrahydro-8-methoxy-5H-[1]benzopyrano[3,4-b]pyridin-5-one

A solution of 21.3 g (0.1 m) of N-acetyl-2-carbethoxy-3-piperidone and 27.7 g (0.23 m) of resorcinolmonomethylether cooled in an icebath and treated with 70 cc of $H_2SO_4$ in 1 hr with stirring and protection from moisture. After stirring at room temperature for 2 days the reaction was poured into 900 cc of ice water. The acid mixture was extracted with $CHCl_3$ 60 cc × 5. The $CHCl_3$ extract was washed with water, dried ($Na_2SO_4$), and evaporated in vacuo. Crystallization of the residue from EtOH afforded 9.0 g (33 percent) of the N-acetyl derivative. Heating the acetyl derivative in 4N HCl 10 cc/g. for 2 hrs. and cooling to room temperature yielded 82 percent of the amine HCl. Recrystallization from methanol afforded analytical material, mp. 240°–52°C (dec. constant melting point).

Anal. Calcd for $C_{13}H_{13}NO_3 \cdot HCl$: C, 57.72; H, 5.48; N, 5.08; Cl, 12.86. Found: C, 57.64; H, 5.48; N, 5.03; Cl, 12.70.

EXAMPLE 8

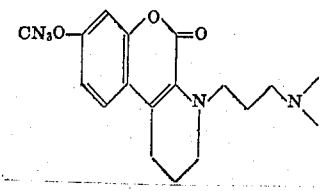

4-[3-(Dimethylamino)propyl]-1,2,3,4-tetrahydro-8-methoxy-5H-[1]-benzopyrano[3,4-b]pyridin-5-one A solution of 4.0 g (0.015 m) of 1,2,3,4-tetrahydro-8-methoxy-5H-[1]benzopyrano[3,4-b]pyridin-5-one HCl, 2.85 g (0.018 m) of N,N-dimethyl-3-chloropropylamine HCl, and 5.05 g triethylamine in 125 cc ethanol was refluxed for 6 hrs. and was then treated with excess HCl gas. Precipitate was filtered off and crystallized from methanol affording 1.7 g (29 percent) of analytical material, mp. 259°–60°.

Anal. Calcd for $C_{18}H_{24}N_2O_3 \cdot 2HCl \cdot 1/2\ CH_3OH$: C, 54.82; H, 6.96; N, 6.91; Cl, 17.49. Found: C, 54.86; H, 6.81; N, 6.51; Cl, 17.74.

We claim:

1. A compound of the formula

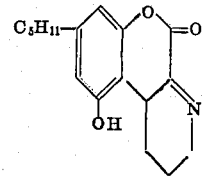

or a salt thereof with an anion of a pharmaceutically acceptable acid.

2. A compound of the formula

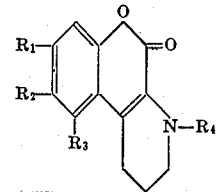

wherein $R_4$ is lower alkyl or acetyl; or a salt thereof with an anion of a pharmaceutically acceptable acid.

3. 1,2,3,10b-Tetrahydro-10-hydroxy-8-pentyl-5H-[1]benzopyrano[-b]-pyridin-5-one.

4. 1,2,3,4-Tetrahydro-10-hydroxy-4-methyl-8-pentyl-5H-[1]benzopyrano[3,4-b]pyridin-5-one.

5. 1,2,3,4-Tetrahydro-4-acetyl-10-hydroxy-8-pentyl-5H-[1]benzopyrano-[3,4-b]pyridin-5-one.

* * * * *